United States Patent
Olgaard et al.

(10) Patent No.: US 8,693,529 B2
(45) Date of Patent: Apr. 8, 2014

(54) METHOD FOR ENABLING A DEVICE UNDER TEST (DUT) TO RETRY A PORTION OF A PRE-DEFINED TEST SEQUENCE

(75) Inventors: Christian Volf Olgaard, Saratoga, CA (US); Ruizu Wang, San Ramon, CA (US); Guy Shaviv, Zichron Yaakov (IL)

(73) Assignee: Litepoint Corporation, Sunnyvale, CA (US)

( * ) Notice: Subject to any disclaimer, the term of this patent is extended or adjusted under 35 U.S.C. 154(b) by 0 days.

(21) Appl. No.: 13/437,652

(22) Filed: Apr. 2, 2012

(65) Prior Publication Data

US 2013/0259097 A1   Oct. 3, 2013

(51) Int. Cl.
*H04B 3/46* (2006.01)

(52) U.S. Cl.
USPC ......... 375/224; 370/241; 375/219; 379/26.02

(58) Field of Classification Search
None
See application file for complete search history.

(56) References Cited

U.S. PATENT DOCUMENTS

| | | | |
|---|---|---|---|
| 5,784,558 A * | 7/1998 | Emerson et al. | 709/230 |
| 2006/0005096 A1 | 1/2006 | Cullen et al. | |
| 2008/0243828 A1 | 10/2008 | Reztlaff et al. | |
| 2009/0309556 A1 | 12/2009 | Franco et al. | |
| 2011/0161763 A1 | 6/2011 | Yamada | |

OTHER PUBLICATIONS

International Search Report Dated Jun. 26, 2013 for PCT/US2013/028205: 6 Pages.
Written Opinion Dated Jun. 26, 2013 for PCT/US2013/028205; 5 Pages.

* cited by examiner

*Primary Examiner* — Adolf Dsouza (57) ABSTRACT

Execution of a block test "retry" in a test environment with each block in the test sequence sent after the tester has determined that the previous block of data packets has met one or more prescribed test criterion. If a block sent by the DUT has not met the test criterion, a retry sequence is initiated to re-test the block. In another embodiment, a block test "retry" is executed where each block in the test sequence is sent and analysis of previously sent blocks is done in parallel with the sending of a subsequent block. If a previous block has not met the test criterion, a retry sequence is initiated whereby the tester and DUT step back to the block that failed to meet the test criterion and retry that block. If the retry meets test criterion, testing continues by resuming with the next untested block in the sequence.

12 Claims, 6 Drawing Sheets

METHOD FOR ENABLING A DEVICE UNDER TEST (DUT) TO RETRY A PORTION OF A PRE-DEFINED TEST SEQUENCE

TECHNICAL FIELD

The present invention relates generally to methods for testing electronic equipment. More particularly, it relates to improvements in methods for testing wireless devices using test platforms consisting of hardware, firmware and/or software components requiring minimal feedback from the devices.

BACKGROUND

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, all of these wireless-connectivity capabilities (e.g. WiFi, WiMAX, Bluetooth, etc.) are defined by industry-approved standards (e.g. IEEE 802.11 and IEEE 802.16) which specify the parameters and limits to which devices having those connectivity capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals, and to send signals that subscribe to industry-approved standards so as to determine whether a device is receiving and processing the wireless signals in accordance with its standard.

In some instances, a device-under-test (DUT) may be subjected to a predefined test sequence in order to speed up test execution. This may include a test sequence applied to or stored directly within the DUT. The configuration of the DUT may also include a means to execute the test sequence. Typically, the test sequences may be grouped into blocks. The blocks, which are successive TX (e.g., the DUT sending packets to the tester), RX (e.g., the tester sending packets to the DUT) or TX and RX (packets being sent both directions) measurements, may be subsequently executed as entities.

Generally, in sequence testing conventional electronic systems, an entire test sequence is run. This test sequence may or may not include the occurrence of one or more test block failures. When one or more test block failures occurs, there is no obvious way to perform a "retry" in conventional systems, unless direct access to the DUT is available However, in many modern devices creating such direct control is difficult and often time consuming. Thus, in the absence of direct control, the entire test sequent is typically re-run. This action increases the overall test time and decreases the test efficiency while raising costs.

Accordingly, a need exists for enabling a test system to determine when errors occur in a test sequence in a time efficient manner. In the absence of direct control, a further need exists to enabling the test system to automatically "retry" a failed block at a period close to the point of failure rather than having to re-run the entire test sequence at the conclusion of the test.

SUMMARY

It is, therefore, an object of the present invention to overcome the deficiencies of the prior art to include a method for enabling a test system to initiate a retest of a block that failed by having a DUT behave in accordance with a retry protocol and having the tester exploit that protocol in order to initiate that retry. The system in this case will consist of a DUT configured to execute a predefined sequence and to behave in a way consistent with a retry protocol; and a tester capable of interacting with the DUT in the execution of a predefined sequence and capable of exploiting the DUT's retry protocol so as to initiate retrying any blocks that have failed.

In accordance with one disclosed exemplary embodiment, the disclosed invention executes a block test "retry" in a test environment where each block in the test sequence is sent after the analysis subsystem of the tester has determined that the previous block of data packets has met one or more prescribed test criterion. If a block, or portion thereof, sent by the device under test is determined not to have met the prescribed test criterion, a retry sequence is initiated enabling the block to be re-tested.

In accordance with another exemplary embodiment, the disclosed invention executes a block test retry in a test environment where analysis of a previous block may occur during execution of a subsequent block. If a block, or portion thereof, sent by the DUT is determined not to have met the prescribed test criterion, and that determination is made during the execution of a subsequent sequence, a retry sequence is initiated by stepping back some number of blocks to the one determined as having failed. This invention will also permit the test to resume at the next untested block in the sequence.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF EMBODIMENTS

The invention will now be described with reference to the drawing figures, in which like reference numerals refer to like parts throughout. The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawing, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implements using one or more appropriately programmed processors, depending upon the signal frequencies or data rates to be processed.

Figure 1:
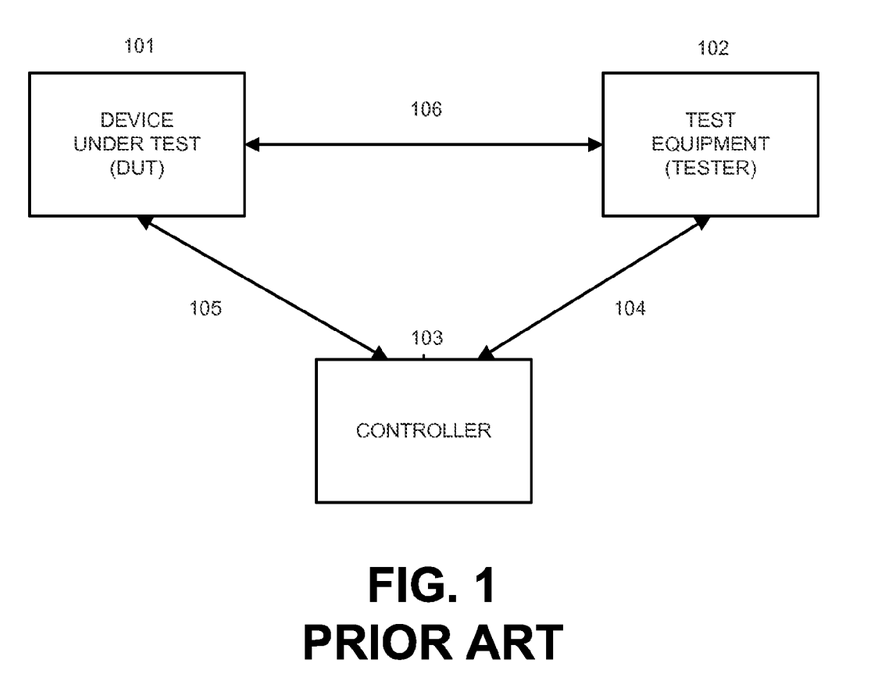
FIG. 1 is a diagram depicting a conventional and prior art test environment and method whereby a controller communicates with a DUT and tester and orchestrates the sending of packets between the DUT and tester.

Referring to FIG. 1, a conventional system for testing wireless devices comprises a DUT (101), a tester (102), a controller (103), and bidirectional communications paths between DUT and controller (105); tester and controller (104), and between DUT and tester (106). These communications paths may be implemented using wired or wireless technologies.

Figure 2:
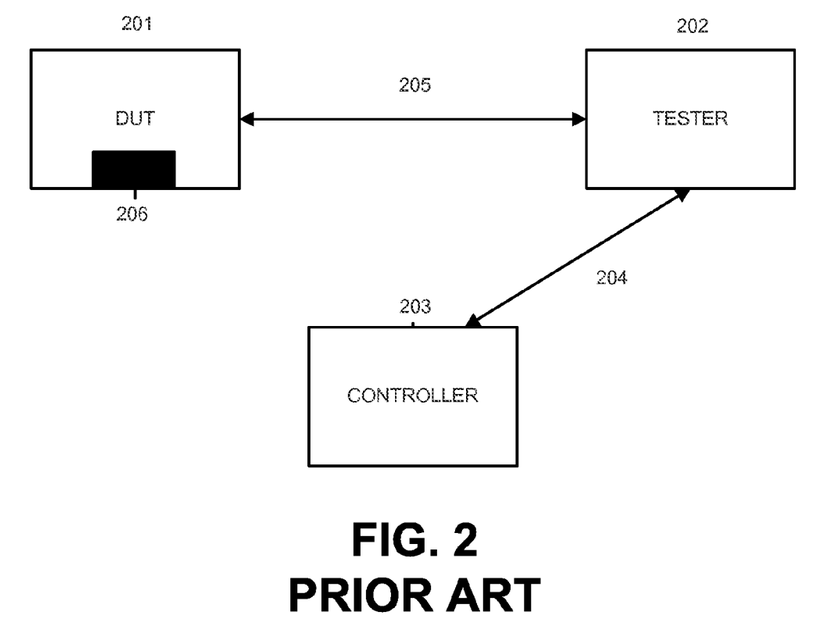
FIG. 2 is a diagram depicting a more recent prior art whereby the DUT stores and executes a predefined sequence of packets sent or received after having established synchronization with the tester. As shown, the communications path between DUT and controller is no longer required.

Referring to FIG. 2, a more recent system for testing wireless devices comprises a DUT (201) configured to store and execute a predefined sequence (206); a tester (202) capable of interacting with the DUT in such a way that after synchronizing with the DUT, a predefined sequence of packets may be sent to or from the DUT with minimal or no control exchanges required. As shown, the DUT (201) and tester (202) communicate through a bidirectional communications path (205); and the tester communicates with a controller (203) through a bidirectional communications path (204). The communications paths may be implemented using wired or wireless technologies.

Figure 3:
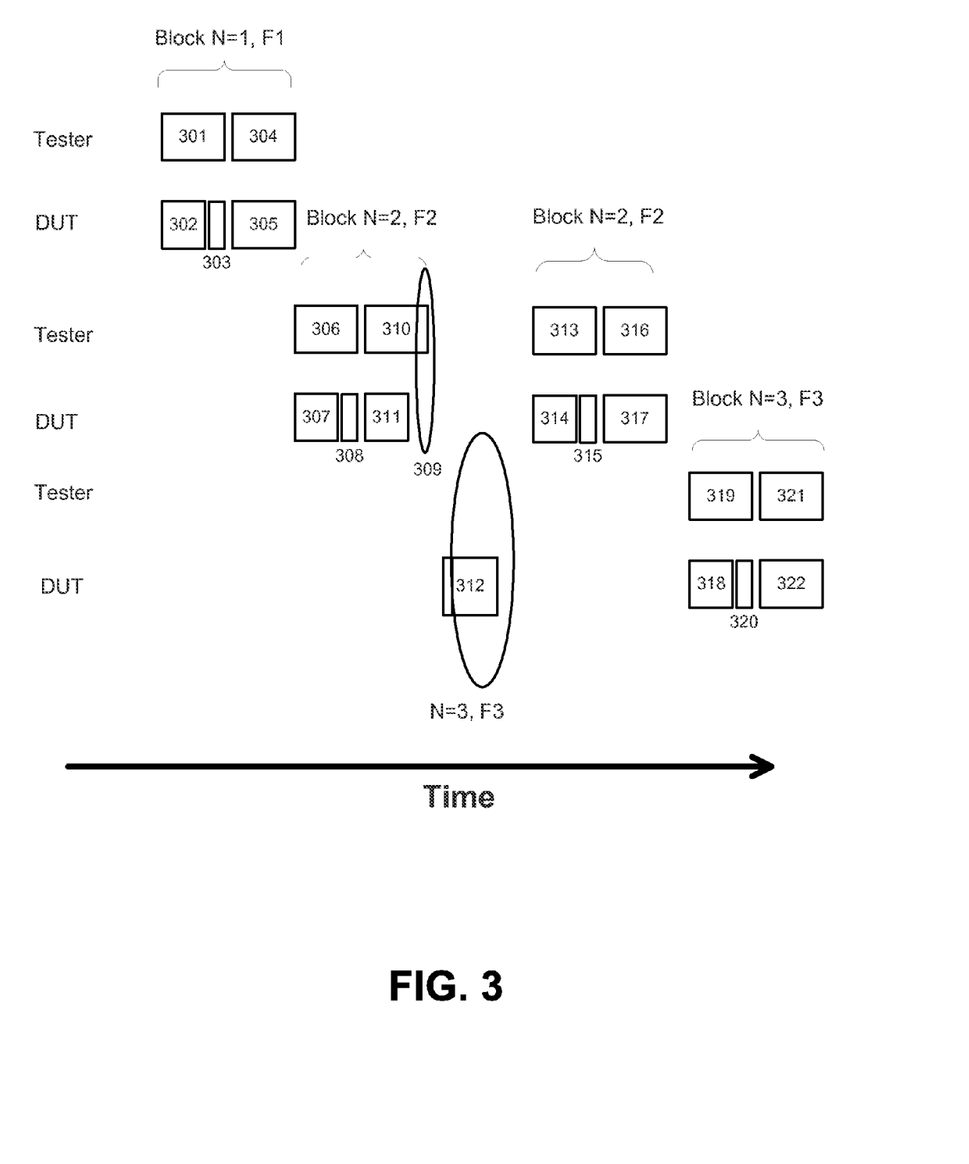
FIG. 3 is a diagram depicting a method for executing a block test "retry" according to a first exemplary disclosed embodiment.

Referring to FIG. 3, a disclosed embodiment for testing a system over a period of time. The method of the disclosed invention executes a block test "retry" in a test environment where each block in the test sequence is sent after the tester's analysis subsystem has determined that the previous block of data packets has met test qualifications. If a block sent by the DUT is determined by the tester not to have met test qualifications, a retry sequence is initiated by the tester enabling the block to be re-tested.

According to one disclosed embodiment, the tester and DUT initiate a defined synchronization exchange of messages (301, 302, and 303) occurring at frequency F1. The tester may include one of a variety of test equipment including, for example, a wireless tester or other electronic components such as a vector signal generator (VSG) and a vector signal analyzer (VSA). The DUT may comprise one or more electronic components and configurations such as a number of embedded sub systems, including a host processor, memory (e.g., non-volatile memory), a wireless transceiver and one or more peripheral devices. The host processor may be configured to control the memory, wireless transceiver and peripheral devices via various control interfaces. Typically, the memory stores, as firmware, programs to be used by the DUT.

The tester sends one or more packets to the DUT during message exchange 301 while the DUT listens for the packet(s) during message exchange 302. Once the DUT has received the expected packet(s) from the tester, it sends an acknowledgement 303 back to the tester, thus showing SYNC has been established. Having achieved synchronization, the DUT sends one or a plurality of a predefined sequence of packets 305 to the tester at frequency F1 (e.g., a TX sequence). The tester receives the aforementioned packet(s) and analyzes them (304) for the desired parameters to determine whether they meet the prescribed test criteria. Blocks 304 and 305 can additionally include scenarios where the tester sends one or more packets to the DUT, e.g., a TX sequence for example, to test the DUT's ability to receive the packet(s). In the present case, the test criteria is met, and the DUT, in accordance with the predefined test flow, changes frequency to F2.

At frequency F2, again, the tester and DUT exchange synchronizing packets (306, 307, and 308). Similar to the testing scheme at frequency F1, the tester sends one or more packet(s) to the DUT during message exchange 306 while the DUT listens for the packet(s) during message exchange 307. Once the DUT has received the expected packet(s) from the tester, it sends an acknowledgement 308 back to the tester, thus showing SYNC has been established. Having achieved synchronization, the DUT, in this example, sends one or a plurality of a predefined sequence of packets 311 to the tester at frequency F2. The tester receives the aforementioned packet(s) and analyzes them 310 for the desired parameters to determine whether they meet the prescribed test criteria. Blocks 310 and 311 can additionally include scenarios where the tester sends one or more packets to the DUT, an RX sequence for example, to test the ability of the DUT to receive the packet(s). In this case, however, there is an error 309. In one embodiment, the error may be determined, for example, by the analysis subsystem of the tester and conveyed to the control subsystem of the tester. The determination of an error may also be caused when the analyzed data from the DUT does not allow a clear determination of a result or where the DUT does not follow the expected (e.g. predefined) sequence. In accordance with disclosed embodiments, the tester is configured to retry the test sequence when an error is determined.

Notably, in an effort to reduce unnecessary feedback and provide efficient electronic control design, the DUT is not configured to directly determine an error event, in accordance with disclosed embodiments. Accordingly, the DUT, unaware of any error or the intention of the tester function to retry a test, progresses to the next testing sequence. In this case, the DUT switches to frequency F3 and awaits the expected synchronization exchange 312. The tester, on the other hand, aware of the error in block N=2 is configured to retry the test which generated the previous error and will not move to the next expected synchronization event. Instead, the tester, which is configured to know the DUT's predefined retry protocol, remains at frequency F2 and attempts to engage in a normal synchronization step (e.g., via message exchange 313, 314 and 315).

Meanwhile, the DUT, having received no further exchange packets from the tester, will time out based on the retry protocol at event 312 and further determines that no synchronization will occur by this event. Accordingly, in response thereto, the DUT is configured based on the retry protocol to step back to the previous frequency (F=F2) and attempt synchronization. The timeout period for the tester is notably configured to be necessarily longer than that of the DUT in order to ensure that the tester will not timeout before the DUT has reverted to its retry routine. Thus, in accordance with the retry scheme at frequency F2, the tester sends one or more packet(s) to the DUT during message exchange 313 while the DUT listens for the packet(s) during message exchange 314. Once the DUT has received the expected packet(s) from the tester, it sends an acknowledgement 315 back to the tester, thus showing SYNC has been established. With synchronization established (315), the DUT sends the same predefined one or plurality of packets (as previously expected from 311 (e.g., 311=317)), and the tester receives and analyzes them 316 to determine whether they meet the test criteria. Blocks 316 and 317 can additionally include scenarios where the tester sends one or more packets to the DUT, an RX sequence for example, to test the ability of the DUT to receive the packet(s). This time, the block N=2 has met the prescribed test criteria. Consequently, the DUT continues and switches to frequency F3. As with blocks 104 and 105, blocks 116 and 317 can additionally include scenarios where the tester sends one or more packets to the DUT, for example, to test the DUT's ability to receive the packet(s).

At frequency F3, the DUT and tester exchange synchronization messages (318, 319 and 320). The tester sends one or more packets to the DUT during message exchange 319 while the DUT listens for the packet(s) during message exchange 318. Once the DUT has received the expected packet(s) from the tester, it sends an acknowledgement 320 back to the tester, thus showing SYNC has been established. Having achieved synchronization, the DUT sends one or a plurality of a predefined sequence of packets 322 to the tester at frequency F3. The tester receives the aforementioned packet(s) and analyzes them 321 to determine whether they meet the prescribed test criteria. At this point, in the exemplary embodiment, the testing sequence is complete. Blocks 321 and 322 can additionally include scenarios where the tester sends one or more packets to the DUT, for example, to test the DUT's ability to receive the packet(s). In the above scenario, most described tests have the DUT transmitting packets to the tester, but those skilled in the art will readily appreciate that tests may also include cases where testers send packets to the DUT and combinations of both.

Figure 4:
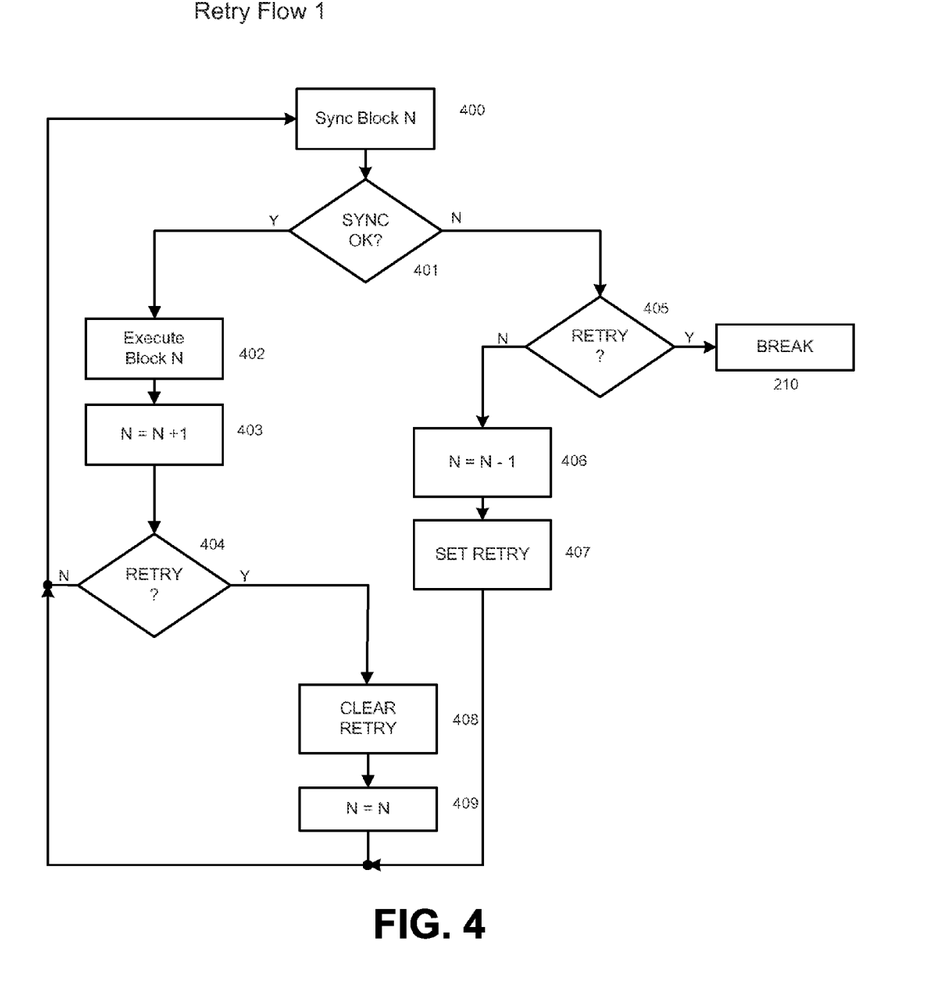
FIG. 4 is a flow diagram illustrating the logical flow in the DUT that supports the method in FIG. 3 according to an exemplary disclosed embodiment.

Referring to FIG. 4, a flow diagram illustrates the logical flow in the DUT that supports the method in FIG. 3. First, a sync 400 for block N is executed (302 and 303 of FIG. 3). If SYNC occurs during transmission of exchange message 303, the "Y" path of the 401 branch is chosen. Then the DUT executes 402 the remainder of block N (e.g., N=1 at F1) by sending and receiving 305 and 304 sequences, respectively. The DUT now increments 403 the block count by 1, N=N+1, that is N=2. Since the RETRY variable is not set (N in 404), the DUT attempts to perform a synchronization for block N=2, F=2, (307, 308 of FIG. 3). For the N=2 block, the DUT follows the same flow as above so N is incremented to N=3. However, an error occurs during block N=2 causing the tester to decide to execute a retry.

With N=3 and F=3, the DUT attempts to obtain a SYNC 400, (312 of FIG. 3), but this time the SYNC did not happen. Consequently, the "N" path of the 401 branch is followed. The DUT then checks if the RETRY variable is set 405. In this case it is not set, so the "N" path of the 405 branch is selected. Thus, N is decreased 406 from N=3 to N=2, and the RETRY variable is set 407, meaning a retry is requested by the tester.

The DUT then executes the SYNC of block N=2 at F=2 (e.g., 313, 314 of FIG. 3). If a SYNC is obtained (e.g., 315 of FIG. 3) the "Y" path of the 401 branch is executed, and Block N (N=2) is executed, followed by an increment of N to N=3. This time, the RETRY is set, so the "Y" path of the 404 branch is selected. As the SYNC executed correctly this time, the RETRY variable is cleared (retry ok) 408, and N is set to N (e.g., N=3) 409.

However, if the SYNC did not occur, the "N" path of branch 401 would have been selected; and, since RETRY was already set the "Y" path of branch 405 is selected and the DUT will break out of the test flow 410. At this point, the test sequence may be configured to perform additional operations such as starting over (e.g., N=1), or alternatively, performing a powering down operation. Other setups may also be considered as will be readily appreciated by those skilled in the art.

Figure 5:
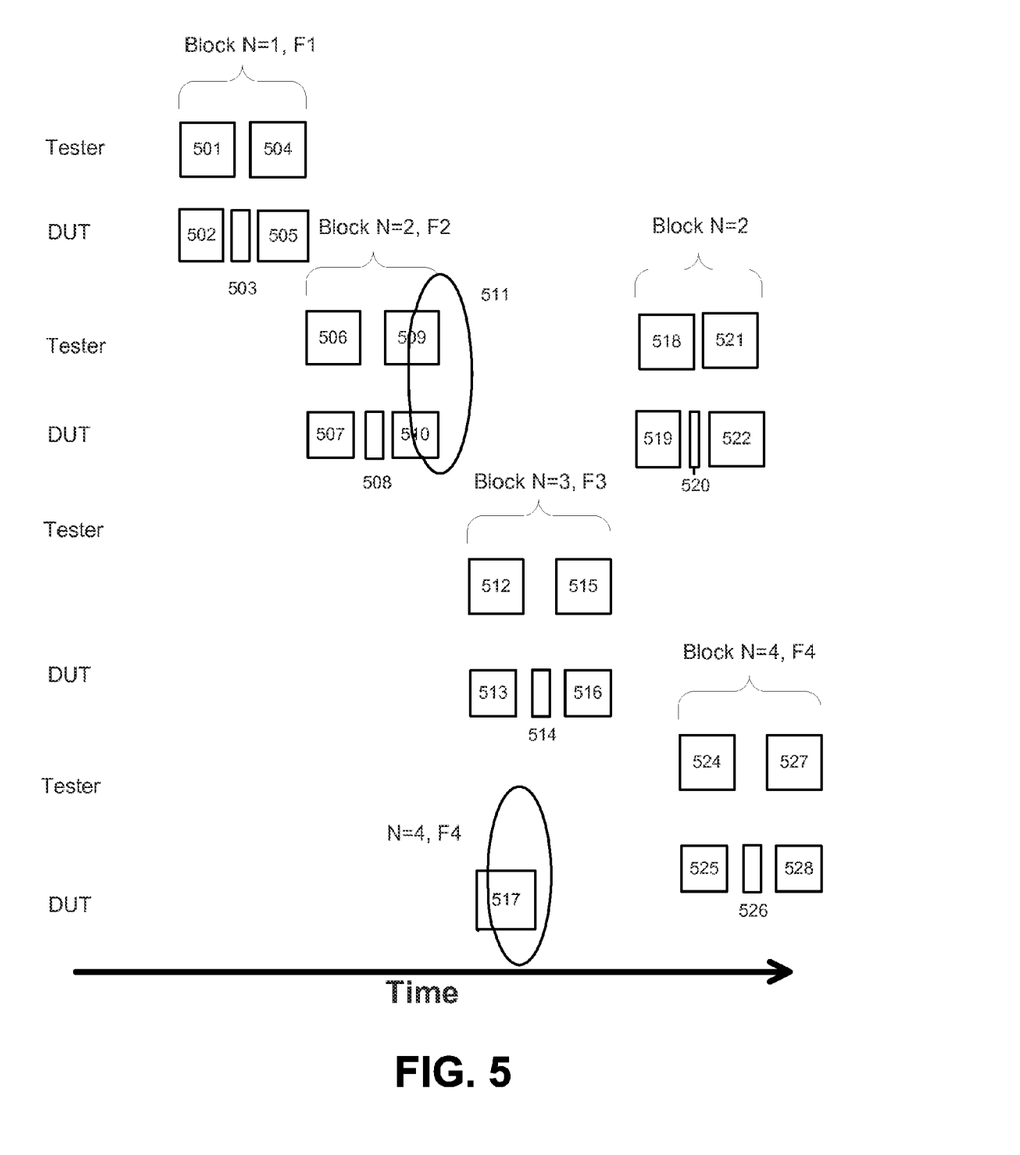
FIG. 5 is a diagram depicting a method for executing a block test "retry" according to another exemplary disclosed embodiment.

In some instances, during a testing sequence, the tester may not recognize and/or have an opportunity to analyze the results of a block test before the DUT and tester have moved on to test another block later in the testing sequence. For example, FIG. 5 illustrates a testing environment and method for executing a block test "retry" in a test environment where each block in the sequence is sent while the analysis subsystem of the tester is operating simultaneously. A determination that a previous block of data packets has met or failed to meet test qualifications may occur during the execution of the subsequent block. As shown, the disclosed embodiment permits the tester to step back, for example, to a necessary amount of blocks in order to re-test one or more blocks that failed. Afterward, if the re-test is successful, the DUT and tester step forward to an appropriate amount of blocks (i.e., previously untested blocks) to resume the predefined test sequence. In the following described example, the test steps back two blocks to re-test the block that failed. Afterward, if the re-test is successful, the DUT and tester step forward two blocks and resume the predefined test sequence.

As in FIG. 3, the tester and DUT of FIG. 5 initiate a defined synchronization exchange of messages (501, 502 and 503) at frequency F1. For example, the tester sends one or more packets to the DUT during message exchange 501 while the DUT listens for the packet(s) during message exchange 502. Once the DUT has received the expected packet(s) from the tester, it sends an acknowledgement 503 back to the tester, thus showing SYNC has been established. Having achieved synchronization, the DUT sends one or a plurality of a predefined sequence of packets 505 at frequency F1. The tester receives the aforementioned packet(s) and analyzes them 504 to determine whether they meet the prescribed test criteria. Blocks 504 and 505 can additionally include scenarios where the tester sends one or more packets to the DUT, for example, to test the DUT's ability to receive the packet(s). In the present case, the test criteria is met, and the DUT, in accordance with the predefined test flow, changes frequency to F2.

Here, again at frequency F=2, the tester and DUT exchange synchronizing packets (506, 507 and 508). Similar to the testing scheme at frequency F1, the tester sends one or more packet(s) to the DUT during message exchange 506 while the DUT listens for the packet(s) during message exchange 507. Once the DUT has received the expected packet(s) from the tester, it sends an acknowledgement 508 back to the tester, thus showing SYNC has been established. Having achieved synchronization, the DUT sends one or a plurality of a predefined sequence of packets 510 to the tester at frequency F2. The tester receives the aforementioned packet(s) and analyzes them 509 to determine whether they meet the prescribed test criteria. Blocks 509 and 510 can additionally include scenarios where the tester sends one or more packets to the DUT, an RX sequence for example, to test the ability of the DUT to receive the packet(s). In this case, however, there is an error 511. In the disclosed embodiment, the error may be determined, for example, by the analysis subsystem of the tester and conveyed to the control subsystem of the tester. The determination of an error may also be caused when the analyzed data from the DUT does not allow a clear determination of a result.

In the disclosed embodiment of FIG. 5, however, the test analysis of the tester is not completed at the occurrence of error 511. Meanwhile the DUT and tester continue in the testing sequence and continually progress to block N=3 at frequency=F3. At frequency F3, the tester and DUT exchange synchronizing packets (512, 513, and 514). Similar to the testing scheme at frequency F1 and F2, the tester sends one or more packets to the DUT during message exchange 512, while the DUT listens for the packet(s) during message exchange 513. Once the DUT has received the expected packet(s) from the tester, it sends an acknowledgement 514 back to the tester, thus showing SYNC has been established. Having achieved synchronization, the DUT sends one or a plurality of a predefined sequence of packets 516 at frequency F3. The tester receives the aforementioned packet(s) and analyzes them 515 to determine whether they meet the test criteria. Blocks 515 and 516 can additionally include scenarios where the tester sends one or more packets to the DUT, for example, to test the DUT's ability to receive the packet(s).

By now, however, the tester may recognize that there was an error in block N=2 at F=2. In this instance, the tester is configured to either verify the error or overcome the error by initiating a retry. The DUT, on the other hand, in an effort to reduce unnecessary feedback and to provide efficient electronic control design according to a disclosed embodiment, may not be configured to directly recognize an error event. Accordingly, the DUT, unaware of any error or the retry function of the tester to re-run a test, continues in its function and switches to frequency F4 and awaits for the expected synchronization exchange 517. Alternatively, the tester, having determined the error in block N=2 is configured to not move to the next expected synchronization event. Instead, the tester is configured to execute a predefined retry scheme based on the anticipated behavior of the DUT according to its retry protocol, and steps back to the point or event of error occurrence. In this case, the error occurred at frequency F2. When this occurs, the DUT will obviously receive no further exchange packets from the tester at this point. The DUT, will time out at event 517 and further determine that no synchronization will occur by this event.

Meanwhile, the tester is configured to execute the retry scheme by attempting to engage in a normal synchronization step (e.g., via message exchange 518, 519, and 520). Again, the timeout period for the tester will be longer than that for the DUT to ensure that the DUT will have sufficient time to time out and revert to the retry routine. The DUT, having determined no synchronization event and having timed out, will step back to F2 and attempting synchronization 519 in accordance with its retry protocol. Thus, in accordance with the retry scheme at frequency F2, the tester sends one or more packet(s) to the DUT during message exchange 518 while the DUT listens for the packet(s) during message exchange 519. Once the DUT has received the expected packet(s) from the tester, it sends an acknowledgement 520 back to the tester, thus showing SYNC has been established. With synchronization established (520), the DUT sends the same predefined one or plurality of packets (as previously expected from 510 (e.g., 510=522)), and the tester receives and analyzes them 521 to determine whether they meet the prescribed test criteria. Blocks 521 and 522 can additionally include scenarios where the tester sends one or more packets to the DUT, an RX sequence for example, to test the ability of the DUT to receive the packet(s). This time, the block N=2 has met the test criteria. Consequently, the DUT continues to the next untested block and switches, in this case, to frequency, F4.

At frequency F4, the tester and DUT exchange synchronizing packets (524, 525, and 526). Similar to the testing scheme at frequencies F1, F2, and F3, the tester sends one or more packet(s) to the DUT during message exchange 524, while the DUT listens for the packet(s) during message exchange 525. Once the DUT has received the expected packet(s) from the tester, it sends an acknowledgement 526 back to the tester, thus showing SYNC has been established. Upon establishing synchronization, the DUT sends one or a plurality of predefined packets 528 to the tester and the tester receives and analyzes them 527 to determine whether they meet the prescribed test criteria. Blocks 527 and 528 can additionally include scenarios where the tester sends one or more packets to the DUT, an RX sequence for example, to test the ability of the DUT to receive the packet(s). At this point, in the exemplary embodiment, the testing sequence is complete. In the above scenario, most described tests have the DUT transmitting packets to the tester, but one should realize that tests can also include cases where testers send packets to the DUT, and combinations of both.

Thus, the disclosed embodiment of FIG. 5 depicts a method for executing a block test "retry" in a test environment where each block in the sequence is sent while the analysis subsystem of the tester is operating simultaneously. The determination that a previous block of data packets has met or failed to meet test qualifications may occur during the execution of the subsequent block. The disclosed embodiment permits the tester to step back to the error occurrence. In this case, the tester steps back two blocks and re-tests the block that failed. Afterward, if the re-test is successful, the DUT and tester step forward to resume testing of the untested blocks. In this case, the DUT and tester step forward two blocks and resume the predefined test sequence.

The embodiment described and depicted in FIG. 5 is for illustrative purpose(s) and discussion(s). It is noted that while the embodiment of FIG. 5 allows the tester to retry a testing error by stepping back two blocks to re-test the block that failed, the test equipment may be configured to recognize a failed testing block more than two blocks away from the error block determination. In which case, the test equipment may be configured to step back to the appropriately numbered blocks to re-test the block that failed. After verification of the re-test (i.e., the re-test is successful) the test equipment may move ahead to an appropriately numbered block to resume testing previously untested blocks. Thus, skilled artisans may readily appreciate that, in the above scenario, the tester and DUT have reverted back two blocks (e.g., N=4 to N=2), however, there is no reason that the retry routine and its supporting logic cannot revert back more blocks if the test analysis (of the tester, for example) takes longer than in the above scenario. In addition, there is no reason that the routine and supporting logic cannot jump ahead to untested blocks to resume the testing sequence once verification occurs.

Figure 6:
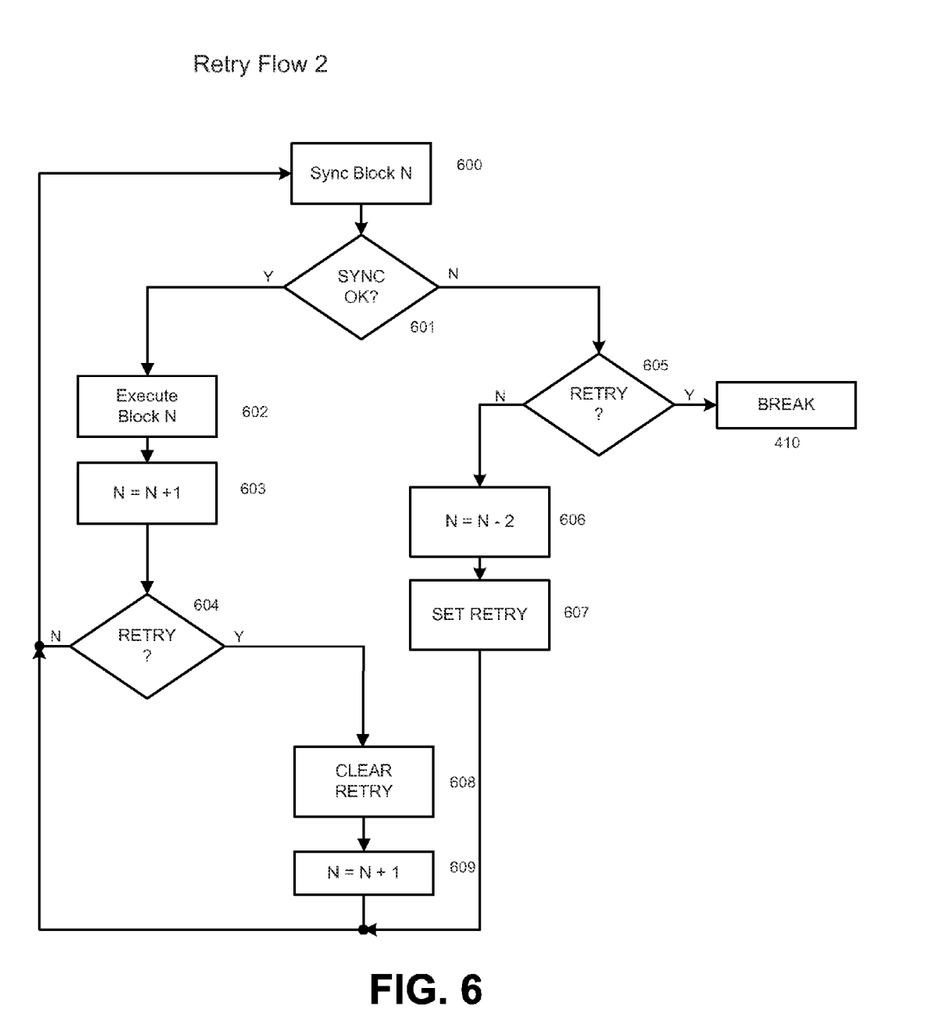
FIG. 6 is a flow diagram illustrating the logical flow in the DUT that supports the method of FIG. 5 according the another exemplary disclosed embodiment.

Referring to FIG. 6, a flow diagram showing the logical flow in the DUT that supports the method, for example, of FIG. 5 is disclosed. First, a sync 600 for block N is executed (501 and 502 of FIG. 3). If SYNC occurs during the transmission of exchange message 503, the "Y" path of the 601 branch is chosen. Then the DUT executes 602 the remainder of block N (e.g., N=1 at F1) by sending and receiving 505 and 504 test sequences, respectively. The DUT now increments 603 the block count by 1, N=N+1, that is N=2. Since the RETRY variable is not set (N in 404), the DUT attempts to perform a synchronization for block N=2, F=2, (507, 508). For the N=2 block, the DUT follows the same flow as above so N is incremented to N=3. Here, because the analysis of the tester for block N=2 is not yet complete, the DUT and tester both execute a synchronization exchange 600 (sending and receiving packets 512, 513 and 514 (see FIG. 5)). Since, at this point, neither DUT nor tester is aware of a block-test failure, the DUT sends packets (516) and the tester receives and analyses them (515). And, the DUT, again advances to N=N+1, or N=4 at F=4. However, an event occurs during block N=2 causing the tester to decide to execute a retry after both the tester and the DUT have completed the testing of block N=3. The DUT has progressed to N=4 and F=4, but the tester, now aware of a problem, is enabled to initiate a retry and reverts back to F=2.

With N=4 and F=4, the DUT attempts to obtain a SYNC (600) (e.g., see 517 of FIG. 5), but this time the SYNC does not happen. Thus the "N" path of the 601 branch is followed. The DUT then checks if the RETRY variable is set 605. In this case it is not set so the "N" path of branch 605 is followed. Thus, N is decreased 606 from N=4 to N=2, and the RETRY variable is set 607, meaning a retry is requested by the tester.

The DUT then executes the SYNC of block N=2 at F=2 (e.g., 518, 519 of FIG. 5). If a SYNC is obtained (e.g., 520) the "Y" path of branch 601 is followed, and Block N (N=2) is executed, followed by an increment of N to N=3. This time the RETRY is set, the "Y" path of branch 604 is followed. As the SYNC executed correctly this time, the RETRY variable is cleared (retry ok), and N is set to N+1 (e.g., N=4) 609.

However, if the SYNC did not occur, the "N" path of branch 601 would have been selected; and, since RETRY was already set, the "Y" path of branch 605 is selected and the DUT will break out of the test flow (610). At this point, the test sequence may be configured to perform additional operations such as starting over (e.g., N=1), or alternatively, performing a powering down operation. Other setups may also be considered as will be readily apparent to those skilled in the art.

In accordance with the exemplary embodiments discussed above, testing of the DUT for the various data blocks N, N+1, N+2, . . . includes transmitting the data blocks at different respective frequencies F1, F2, F3, . . . . However, as will be readily apparent to those of ordinary skill in the art, transmission of the data blocks signal can include changes in other signal characteristics. For example, in addition to or instead of changing the frequency via which the data packets are transmitted, other signal characteristics can be varied, including, without limitation, data rate, signal modulation type and signal power. Accordingly, the prescribed test criterion or criteria can, as desired, involve various signal characteristics including, without limitation, frequency, data rate, signal modulation type and signal power.

Thus, disclosed embodiments of the invention overcome deficiencies of the prior art by eliminating the need to re-run an entire test sequence in the event of the occurrence of one or more test block failures. Advantages of the present embodiments decrease the overall test time test sequence events associated testing costs by enabling a test system to automatically "retry" a failed block rather than having to re-run an entire test sequence. Repeating the testing for only the recently failed block merely adds a fraction of the time to the testing event as compared to convention test systems which require re-running a complete test sequence. Disclosed embodiments of the invention, therefore, shorten the overall test time, increase testing efficiency, and reduce testing costs.

It will be apparent to those skilled in the art that various modifications and variations can be made in the disclosed method without departing from the scope of the disclosure. Additionally, other embodiments of the method will be apparent to those skilled in the art from consideration of the specification. It is intended that the specification and examples be considered as exemplary only, with a true scope of the disclosure being indicated by the following claims and their equivalents.

The foregoing description is presented to enable a person of ordinary skill in the art to make and use the technique, and is provided in the context of the requirement for a obtaining a patent. The present description is the best presently contemplated method for carrying out the present technique. Various modifications to the preferred embodiment will be readily apparent to those skilled in the art and the generic principles of the present technique may be applied to other embodiments, and some features of the present technique may be used without the corresponding use of other features. Accordingly, the present technique is not intended to be limited to the embodiment shown but is to be accorded the widest cope consistent with the principles and features described herein.

What is claimed is:

1. A method of testing a communication device comprising:
listening with a device under test (DUT) for a synchronization initiation message;
if said DUT fails to receive said synchronization initiation message within a synchronization initiation time interval, then listening again with said DUT for said synchronization initiation message;
if said DUT receives said synchronization initiation message within said synchronization initiation time interval, then transmitting with said DUT a synchronization response message, followed by at least one of
listening with said DUT for a synchronization confirmation message, and
executing with said DUT at least a portion of one or more of a plurality of communications of a block-partitioned data packet sequence including neither said synchronization initiation message nor said synchronization confirmation message; and
if said DUT fails said at least one of
listening with said DUT for a synchronization confirmation message, and
executing with said DUT at least a portion of one or more of a plurality of communications of a block-partitioned data packet sequence,
then repeating said listening and transmitting with said DUT.

2. The method of claim 1, wherein said one or more of a plurality of communications of a block-partitioned data packet sequence comprises at least one of:
receiving at least a portion of said block-partitioned data packet sequence;
transmitting at least a portion of said block-partitioned data packet sequence; and
contemporaneously transmitting and receiving at least respective portions of said block-partitioned data packet sequence.

3. The method of claim 1, wherein:
at least one of said synchronization initiation message, said synchronization response message, said synchronization confirmation message and said block-partitioned data packet sequence comprises a data packet signal with a first plurality of signal characteristics;
said method further comprises, following said executing with said DUT at least a portion of one or more of a plurality of communications of a block-partitioned data packet sequence, repeating said listening, transmitting and executing of claim 1, wherein at least one of said synchronization initiation message, said synchronization response message, said synchronization confirmation message and said block-partitioned data packet sequence of said repeated listening, transmitting and executing of claim 1 comprises a data packet signal with a second plurality of signal characteristics; and
one or more of said second plurality of signal characteristics differs from a corresponding one or more of said first plurality of signal characteristics.

4. The method of claim 3, wherein, following at least one of reception with said DUT of said synchronization confirmation message within said synchronization confirmation time interval of said repeated listening, transmitting and executing of claim 1, and
executing with said DUT said at least a portion of one or more of a plurality of communications of a block-partitioned data packet sequence of said repeated listening, transmitting and executing of claim 1,
said method further comprises executing with said DUT at least a portion of one or more of a plurality of communications of another block-partitioned data packet sequence, including at least one of:
receiving at least a portion of said another block-partitioned data packet sequence;
transmitting at least a portion of said another block-partitioned data packet sequence; and
contemporaneously transmitting and receiving at least respective portions of said another block-partitioned data packet sequence.

5. The method of claim 4, wherein said another block-partitioned data packet sequence comprises respective data packet signals with said second plurality of signal characteristics.

6. The method of claim 3, wherein:
at least one of said synchronization initiation and confirmation messages of said repeated listening and transmitting of claim 1 comprises a data packet signal with one of said first plurality of signal characteristics, and
a third plurality of signal characteristics; and
one or more of said third plurality of signal characteristics differs from respective corresponding ones or more of said first and second pluralities of signal characteristics.

7. A method of testing a communication device comprising:
transmitting with a tester a synchronization initiation message;
listening with said tester for a synchronization response message;
if said tester fails to receive said synchronization response message within a synchronization response time interval, then transmitting again with said tester a synchronization initiation message;
if said tester receives said synchronization response message within said synchronization response time interval, then performing at least one of
transmitting with said tester a synchronization confirmation message, and
executing with said tester at least a portion of one or more of a plurality of communications of a block-partitioned data packet sequence including neither said synchronization initiation message nor said synchronization confirmation message; and
if said tester fails said executing at least a portion of one or more of a plurality of communications of a block-partitioned data packet sequence, then repeating said transmitting and listening with said tester.

8. The method of claim 7, wherein said one or more of a plurality of communications of a block-partitioned data packet sequence comprises at least one of:
receiving at least a portion of said block-partitioned data packet sequence;
transmitting at least a portion of said block-partitioned data packet sequence; and
contemporaneously transmitting and receiving at least respective portions of said block-partitioned data packet sequence.

9. The method of claim 8, wherein:
at least one of said synchronization initiation message, synchronization response message, synchronization confirmation message and block-partitioned data packet sequence comprises a data packet signal with a first plurality of signal characteristics;
said method further comprises, following said executing with said tester at least a portion of one or more of a plurality of communications of a block-partitioned data packet sequence, repeating said transmitting, listening and executing of claim 7, wherein at least one of said synchronization initiation message, said synchronization response message, said synchronization confirmation message and said block-partitioned data packet sequence of said repeated transmitting, listening and executing of claim 7 comprises a data packet signal with a second plurality of signal characteristics; and
one or more of said second plurality of signal characteristics differs from a corresponding one or more of said first plurality of signal characteristics.

10. The method of claim 9, wherein, following said executing with said tester said at least a portion of one or more of a plurality of communications of a block-partitioned data packet sequence of said repeated transmitting, listening and executing of claim 7, said method further comprises executing with said tester at least a portion of one or more of a plurality of communications of another block-partitioned data packet sequence, including at least one of:

receiving at least a portion of said another block-partitioned data packet sequence;

transmitting at least a portion of said another block-partitioned data packet sequence; and contemporaneously transmitting and receiving at least respective portions of said another block-partitioned data packet sequence.

11. The method of claim 10, wherein said another block-partitioned data packet sequence comprises respective data packet signals with said second plurality of signal characteristics.

12. The method of claim 9, wherein:

at least one of said synchronization initiation and confirmation messages of said repeated transmitting, listening and executing of claim 7 comprises a data packet signal with one of said first plurality of signal characteristics, and a third plurality of signal characteristics; and one or more of said third plurality of signal characteristics differs from respective corresponding ones or more of said first and second pluralities of signal characteristics.

\* \* \* \* \*